United States Patent [19]
Roberto et al.

[11] Patent Number: 5,691,048
[45] Date of Patent: Nov. 25, 1997

[54] DUAL COATED METAL SUBSTRATES AND METHODS OF MAKING THE SAME

[75] Inventors: Oscar E. Roberto, Farmington Hills; Marc A. Maxim, Sterling Heights, both of Mich.

[73] Assignee: Henkel Corporation, Plymouth Meeting, Pa.

[21] Appl. No.: 589,828

[22] Filed: Jan. 22, 1996

Related U.S. Application Data

[63] Continuation of Ser. No. 276,284, Jul. 18, 1994, Pat. No. 5,486,414.
[51] Int. Cl.⁶ .......................... B32B 15/04; B32B 15/08; B05D 3/04; C23F 7/26
[52] U.S. Cl. .......................... 428/334; 428/142; 428/457; 428/461; 428/651; 427/341; 427/377; 427/378; 427/379; 427/388.4
[58] Field of Search ........................ 428/457, 651, 428/461, 334, 142; 427/341, 377, 378, 379, 388.4

[56] References Cited

U.S. PATENT DOCUMENTS 5,486,414  1/1996  Roberto ................... 428/334

*Primary Examiner*—Leszek Kiliman
*Attorney, Agent, or Firm*—Ernest G. Szoke; Wayne C. Jaeschke; Norvell E. Wisdom, Jr.

[57] ABSTRACT

Article of manufacture and method of making the same in which a metal substrate has an undercoating is made from a combination of at least one pulverulent metal and a transition metal compound and a coating thereon containing an autodeposited resin formed under autodepositing conditions.

20 Claims, No Drawings

DUAL COATED METAL SUBSTRATES AND METHODS OF MAKING THE SAME

CROSS-REFERENCE TO RELATED APPLICATION

This application is a continuation of application Ser. No. 08/276,284 filed Jul. 18, 1994, now U.S. Pat. No. 5,486,414.

1.0 FIELD OF THE INVENTION

The present invention is directed to coated metal substrates having improved corrosion resistance and other valuable properties in which the metal substrates have an undercoat of an adherent, water soluble layer containing pulverulent metal and an overcoat of an autodeposited material.

2.0 BACKGROUND OF THE INVENTION

Metal substrates including unthreaded parts such as panels and fasteners and threaded parts in the form of nuts, bolts and other parts useful for the automotive and other industries are coated to improve resistance to corrosion and to provide other desirable properties.

It is known to coat metal substrates with an aqueous coating composition which provides an adherent, water insoluble, alkali and corrosion resistant coating. For example Irving Malkin et al., U.S. Pat. No. 3,671,331 and Leo D. Barrett et al., U.S. Pat. No. 3,907,608 and patents cited therein disclose a coating composition which is made from an intimate mixture in an aqueous liquid medium of a hexavalent-chromium-providing substance and a pulverulent metal and may further contain a water soluble organic liquid substance. Such compositions provide corrosion resistance on such metal substrates as aluminum, zinc, cadmium, titanium, mixtures and alloys thereof, and the like.

Modifications have been made to such compositions to improve corrosion resistance and other properties of the coating. For example, Bert E. Palm et al., U.S. Pat. No. 3,849,141 employs zinc as the pulverulent metal in finally divided form so as to improve adhesion. Jon A. deRidder, U.S. Pat. No. 3,940,280 discloses the addition of a minor amount of water soluble cellulose ether to improve the foam suppression properties of the coating liquid.

Walter H. Gunn et al., U.S. Pat. No. 3,954,510 disclose an improvement in the stability of the coating composition through the pH control of the components of the composition. Takao Higashiyama et al., U.S. Pat. No. 4,266,975 disclose an anti-corrosive coating composition using an optional pH modifier and the substitution of a boric acid component for a portion of the chromic acid component. Each composition is stated to provide improved corrosion-resistant properties in both fresh and salt water environments.

Michel Fourez et al., U.S. Pat. No. 4,891,268 disclose the addition of a solid lubricant to the coating composition, particularly for the coating of threaded devices such as nuts, bolts and the like. Arthur A. Luecke et al., U.S. Pat. No. 5,006,597 disclose a two layer coating system in which the underlying layer contains chromium in non-elemental form and the top coating is comprised of an aqueous colloidal dispersion of carbon black. Such coatings are stated to be particularly useful in the automotive industry for treating small metal parts such as metal fasteners, nuts, bolts and interior body panels. The coating composition is further stated to provide a uniform black color which is particularly desirable in the automotive industry although commercial acceptance has not been forthcoming. All of the above-mentioned United States patents are incorporated herein by reference.

Autodepositing compositions are also known for coating metal substrates to improve corrosion resistance. Such compositions are generally comprised of aqueous solutions of acid and an oxidizing agent, and aqueous dispersed resin. Autodeposition is similar to electrodeposition, but does not require the aid of external electrical current to deposit the resin particles on the metal surface. Such coatings have a relatively high degree of corrosion resistance and, when the autodepositing composition contains a suitable pigment, are particularly suited for providing a uniform colored (e.g. black) appearance, highly desirable in many industries including the automotive industry.

Examples of autodepositing compositions are disclosed, for example, in European Patent Publication 0132828, Bashir M. Ahmed, U.S. Pat. No. 4,647,480 and Wilbur S. Hall, U.S. Pat. No. 4,186,219 and patents cited therein each of which is incorporated herein by reference. Such compositions are particularly effective when the resin material is provided in the form of a latex made from the emulsion polymerized product of at least two polymerizable ethylenically unsaturated monomers.

Despite these efforts there remains the need for developing coatings for metal substrates with improved properties, especially corrosion resistance. In addition it is highly desirable to provide corrosion resistant metal parts having a uniform black color.

To this end, applicants have surprisingly determined that an autodeposited coating, heretofore applied directly to the metal part itself, can be effectively applied and bonded to an adherent coating of the type described in, for example, Irving Malkin et al., U.S. Pat. No. 3,671,331 and Leo D. Barrett et al., U.S. Pat. No. 3,907,608, and other related patents including those cited herein. The resulting coated product exhibits excellent corrosion resistance and may be produced with a commercially acceptable uniform black color.

3.0 SUMMARY OF THE INVENTION

The present invention is generally directed to an article of manufacture in the form of a metal substrate, such as bolts, nuts, panels, fasteners and the like. At least a portion of the surface of the metal substrate is coated with consecutive layers of corrosion resistant materials. The first coating or undercoating which directly contacts the metal substrate is an adherent, water insoluble coating principally composed of a pulverulent metal, a transition metal compound and optionally an organic matrix. The second coating adheres or bonds to the first coating and is comprised of an autodeposited resin formed under autodepositing conditions. The thus coated metal substrate exhibits excellent corrosion resistance and when the autodeposited composition further contains black pigment such as carbon black, the coated article has a uniform black color. Methods of forming the article of manufacture are part of the present invention as well.

In particular, the article of manufacture of the present invention comprises:

a) a metal substrate having a surface;

b) an adherent, water insoluble first coating on at least a portion of the surface of the metal substrate, said first coating comprising at least one pulverulent metal and a transition metal compound; and c) a second coating effectively bonded to the adherent, water insoluble coating, said second coating comprising an autodeposited resin formed under autodepositing conditions.

The first coating may optionally contain a matrix formed of an organic compound. In addition, when a colored article of manufacture is desired, the second coating may contain a suitable pigment, such as carbon black which imparts a uniform black color to the metal substrate.

4.0 DETAILED DESCRIPTION OF THE INVENTION

As used herein the term "autodeposited resin" shall mean all resins which can be autodeposited. Autodeposition is a water borne, organic coating process which uses chemical reactions instead of electrical energy to achieve deposition of a high quality organic finish.

Those resins which can be autodeposited generally comprise at least one ethylenically unsaturated monomeric compound (e.g. vinyl-based resins). The preferred ethylenically unsaturated monomers include styrene-butadiene; acrylate; alkyl-substituted acrylates such as methyl methacrylate and ethyl methacrylate; vinyl halides such as vinyl chloride; vinylidene halides such as vinylidene chloride and vinylidene dichloride; alkylenes such as ethylene; halide-substituted alkylenes such as tetrafluoroethylene; and acrylonitriles such as acrylonitrile, combinations thereof and the like.

The autodeposited resin is formed into a coating in accordance with the present invention through the use of an autodepositing composition. Such compositions are typically resin-containing acidic-aqueous compositions comprising an acid, an oxidizing agent and the aqueous dispersed resin, preferably at a concentration of no more than abut 10% by weight. Examples of autodeposited compositions which may be used in the present invention and the manner in which they are made are set forth in European Patent Publication 0132828 and U.S. Pat. Nos. 4,647,480 and 4,186,219, each incorporated herein by reference.

The acids which may be used in the autodepositing composition include inorganic and organic acids, such as, for example, hydrofluoric acid, sulfuric acid, nitric acid, phosphoric acid, acetic acid, halogen—substituted acetic acid such as chloroacetic acid and trichloroacetic acid, and citric acid. Hydrofluoric acid is the preferred acid.

The oxidizing agents which can be employed in an autodepositing composition for use in the present invention include peroxides such as hydrogen peroxide, chromates and dichromates such as chromic acid and potassium dichromate, nitrates such as nitric acid and sodium nitrate, persulfates such as sodium persulfate and ammonium persulfate, perborates such as sodium perborate, iron (III) such as ferric fluoride. Hydrogen peroxide and ferric fluoride are the preferred oxidizing agents.

The preferred autodepositing compositions for use in the present invention are those where the resin is in the form of a latex (i.e. an emulsion polymerization product of at least one polymerizable ethylenically unsaturated monomer) most preferably with an aqueous dispersed resin content of less than 10% by weight. Examples of such compositions include Autophoretic 800 Series autodepositing compositions based on polyvinylidene resins and Autophoretic 700 Series autodepositing compositions based on acrylic resins, each composition being made by Parker Amchem. Such compositions preferably contain hydrofluoric acid and hydrogen peroxide or iron (III) fluoride as the oxidizing agent.

The coatings produced by autodepositing compounds under autodepositing conditions generally have a thickness of at least 0.3 mils, preferably from about 0.5 to 1.5 mils.

The undercoating or first coating applied to the metal substrate contains a pulverulent metal, a transition metal compound and optionally an organic compound matrix. The pulverulent metal may be any metal suitable for forming the coating and includes such metals as zinc, nickel, aluminum, manganese, magnesium and the like as well as alloys and mixtures thereof. The preferred metals are zinc, aluminum and combinations thereof typically in the form of flakes or dust.

The pulverulent metal is preferably in finely divided form, most preferably having a particle size of less than about 16 microns, and typically will have an average particle size in the range of form about 3.2 to 6 microns.

The amount of the pulverulent metal in the coating layer may vary but is preferably based upon no more than about 500 grams of the metal per liter of the coating composition liquid medium. In most cases 150 to 400 grams of metal per liter of the liquid medium is sufficient.

The transitional metal compounds include chromium, molybdenum, manganese and the like. The preferred compounds are those containing chromium. The preferred chromium compounds are those which provide hexavalent-chromium as disclosed, for example, in U.S. Pat. Nos. 3,671,331 and 3,907,608. Such compounds include chromic acid, chromic acid anhydride and dichromate compounds such as ammonium dichromate, sodium dichromate and the like.

The organic compounds which can be used as the optional matrix for the undercoating include organic compounds which are liquid at the boiling point of water and soluble or miscible in water. Such compounds are normally used to form the undercoating in accordance with the present invention to obtain best results. However, as disclosed, for example, in U.S. Pat. No. 3,671,331, the organic compound constituent need not be used. The organic compounds must also be retained in the coating after curing. Preferred examples of the organic compounds are glycols such as dipropylene glycol and trimethylene glycol, and ethers thereof as well as alcohols such as t-butanol and the like. Up to 50 volume percent of based on the total volume of liquid in the aqueous medium can be supplied by the organic compound. Such organic compounds are disclosed, for example, in U.S. Pat. No. 3,907,608.

Metal substrates made of aluminum, zinc, cadmium, titanium, mixtures and alloys thereof and the like may be coated in accordance with the invention. In addition, the metal substrate may have a flat coating surface such as a panel or an irregular surface such as threads associated with screws, bolts, nuts, fasteners and the like.

The undercoating of the present invention can be applied to a metal surface that has been preferably cleaned and degreased in a conventional manner. Commercially available alkaline solutions can be used to clean the metal substrate after degreasing with known agents such as caustic soda, carbon tetrachloride and the like. The undercoating composition may be applied by immersion, spraying, brushing or the like. After applying the undercoating composition, it is desirable to cure the coated substrate by heating to temperatures, typically above about 400° F., more typically above about 450° F.

After curing the coated metal substrate is contacted with the autodepositing composition employed in the present invention by immersion, spraying, flow coating, brushing or the like. Optionally, the undercoated panel may be treated with a mild cleaning solution and/or rinse before contact with the autodepositing composition. Care should be taken not to employ a highly reactive cleaning solution since this may cause the undercoating to separate from the metal substrate.

Thereafter the metal substrate is treated to cure the autodepositing composition. Curing can be accomplished by heating to temperatures sufficient to cure the resin. The curing temperature will vary with the autodepositing composition and particularly the autodeposited resin. For example, Autophoretic 800 Series autodepositing compositions containing polyvinylidene resins are cured at temperatures above about 190° F., preferably from about 200° to 220° F. Autophoretic 700 Series autodepositing compositions containing acrylic resins are typically cured at temperatures above 300° F., preferably from about 325° to 350° F.

EXAMPLE 1

350 g of zinc flake having a particle thickness of about 0.1–0.2 micron and a longest dimension of discreet particles of about 15 microns are added to 200 ml of diethylene glycol containing 4 ml of a nonionic, modified polyethoxy adduct having a viscosity of 180 centipoises at 180° C. and a density at 25° C. of 8.7 pounds per gallon. The mixture is blended with vigorous high shear agitation for five minutes to form a zinc flake slurry.

A chromic acid solution is prepared by adding 50 grams of chromic acid to 400 ml of deionized water under moderate stirring.

300 ml of a solution containing 2 g of hydroxyethyl cellulose as a thickener is added to the zinc flake slurry. The chromic acid solution is added to the mixture of slurry and thickener under moderate agitation to form a first undercoating composition bath.

Alternatively, Dacromet 320® which are aqueous coating dispersions containing chromium, zinc flake, up to a major amount of aluminum and proprietary organics may be purchased from Metal Coatings International (Chardon, Ohio).

EXAMPLE 2

Sufficient zinc flake of the type described in Example 1 is added to diethylene glycol monoethyl ether (DGME) together with 3 ml of the modified polyethoxy adduct used in Example 1 to form a dispersion of the zinc flake and the modified polyethoxy adduct in the DGME at a concentration 300 g/l. Separately a chromic acid solution is formed having a $CrO_3$ concentration of 60 g/l.

The chromic acid solution is slowly added to the metal flake dispersion under stirring to form a second undercoating composition.

EXAMPLE 3

Dacromet 320® containing a major amount of aluminum and a minor amount of zinc was coated onto test panels made of cold roll low carbon steel using the following method.

The panels are first immersed in water containing 2–5 ounces of cleaning solution per gallon of water. The cleaning solution is typically about 75% by weight of potassium hydroxide and 25% by weight of tripotassium phosphate. The bath is maintained at about 150° to 180° F. After cleaning the panels are rinsed with water and optionally dried.

The panels are then immersed in the undercoating composition and removed allowing excess bath to drain therefrom. The panels are then heated to a temperature of 475° F. for 6 to 12 minutes to cure the coating and thereby produce undercoated panels.

EXAMPLE 4

The undercoated panels prepared in accordance with Example 3 were coated with an autodepositing composition containing acrylic latex resin (Rhoplex WL-91 made by Rohm and Haas), carbon black, ferric fluoride in an amount sufficient to provide an iron (III) content of from about 0.2 to 5.0 g/l, hydrofluoric acid in an amount sufficient to provide a pH of from 1 to 4 and hydrogen peroxide. The composition contained 4 to 10% by weight of combined solids of the resin and carbon black. The coating operation was performed in the following manner.

The undercoated panels were first sprayed with a degreaser (Parco Cleaner 1007 made by Parker Amchem) for one minute followed by immersion in an alkaline cleaning solution (Parco Cleaner 1530 made by Parker Amchem) for two minutes at 150° F. After rinsing for one minute in tap water and thereafter for one minute in deionizing water, the panels were immersed in a bath of the autodepositing composition for 90 seconds maintained at 70° F.

The panels were rinsed with tap water followed by rinsing with a chromic acid containing rinse (Autophoretic Reaction Rinse 1087 made by Parker Amchem). The panels were then placed in a gas oven and heated for 30 minutes at 350° F. to effect curing of the autodeposited resin material to thereby produce coated panels in accordance with the present invention.

The coated panels were tested to measure resistance to corrosion using a salt spray method (ASTM-117). The coated panels were also tested to determine the strength of bonding between the autodeposited coating and the undercoating by a peel test. The peel test was conducted by applying an adhesive tape to the autodeposited coating. The tape was then peeled off and any removal of the autodeposited coating noted.

The test panels exhibited excellent corrosion resistance and possessed a uniform black color. The undercoating and top coating were satisfactorily bonded together. In some cases the undercoating may separate from the metal substrate. In this event, it may be desirable to employ a milder alkaline solution for cleaning the undercoated substrate or to clean with just tap water or to eliminate the cleaning step entirely.

EXAMPLE 5

Screws coated with Dacromet 320® were coated and tested in substantially the same manner as described in Example 4. The screws exhibited excellent corrosion resistance and possessed a uniform black color. The undercoating and top coating were satisfactorily bonded together although in some cases separation occurs between the undercoating and the surface of the screw.

EXAMPLE 6

Screws coated with Dacromet 320® containing a major portion of aluminum and a minor portion of zinc were coated with an autodepositing composition containing polyvinylidene dichloride latex resin, carbon black, ferric fluoride in an amount sufficient to provide an iron (III) content of from about 2.0 to 5.0 g/l, hydrofluoric acid in an amount sufficient to provide a pH of 1 to 4 and hydrogen peroxide. The composition contained 4 to 10% by weight of combined solids of the resin and carbon black. The coating operation was performed in the following manner.

The undercoated screws were washed with tap water, immersed in a bath of the autodepositing composition for 90 seconds at 70° F. The coated screws were then rinsed with tap water, rinsed with a chromic acid containing rinsing solution (Autophoretic 1087 Reaction Rinse made by Parker Amchem) and then cured in a gas oven for 30 minutes at 230° F.

The screws were then tested for corrosion resistance and adhesion between the undercoating and the autodeposited coating. The screws exhibited excellent adhesion between the undercoating and the autodeposited coating although in some cases there was separation between the undercoating and the surface of the screws. The screws exhibited uniform black color. Resistance to corrosion was generally good although some screws showed minor pinholing and/or blistering.

EXAMPLE 7

Screws coated with Dacromet 320® containing only zinc pulverulent metal were coated and tested in the same manner as described in Example 6. The screws exhibited excellent adhesion between the undercoating and the autodeposited coating. Minor separation between the undercoating and the surface of the screw was noted in a few cases. Corrosion resistance was excellent and the screws exhibited a uniform black color.

What is claimed is:

1. A method for coating a metal substrate, said method comprising steps of:
   (I) applying onto the metal substrate a first liquid coating composition comprising, in an aqueous liquid medium, an intimate mixture of:
      (i) a hexavalent chromium-providing substance, supplied by about 80 to about 100 weight percent chromic acid and providing above 5 but below about 100 grams per liter of chromium, expressed as $CrO_3$;
      (ii) above 50 but below about 500 grams per liter of liquid medium of pulverulent metal selected from the group consisting of zinc, aluminum, mixtures thereof and alloys of same, said first composition having a weight ratio of chromium, expressed as $CrO_3$, to pulverulent metal of between about 1:1 and 1:15;
      (iii) below about 50 volume percent but substantially above about 15 volume percent, based on the volume of the total liquid of the first liquid coating composition, of water soluble organic liquid substance that maintains liquidity above 100° C. and is selected from the group consisting of tri- and tetra-ethylene glycol, di- and tri-propylene glycol, and the water soluble $C_1$–$C_4$ ethers of all such foregoing glycols, diacetone alcohol, the water soluble $C_1$–$C_4$ ethers of diethylene glycol, and mixtures of the foregoing; and
      (iv) above about 0.0005 volume percent based on the total volume of first liquid coating composition, of dispersing agent;
   (II) heating the substrate and the liquid coating formed thereon in step (I) at a temperature, and for a period of time, sufficient to convert the liquid coating formed in step (I) to an adherent, water insoluble first solid coating on the substrate;
   (III) applying onto the surface of the first solid coating formed in step (II) a second liquid coating of an acidic aqueous composition comprising dispersed resin solids and an activator, which acidic aqueous composition forms on a metallic surface a resinous coating that increases in thickness the longer the surface is contacted with the composition, to form an uncured autodeposited second liquid coating over said first solid coating; and
   (IV) curing the uncured autodeposited second liquid coating formed in step (III) to form an autodeposited second solid coating bonded to the adherent, water insoluble first coating.

2. A method according to claim 1, wherein component (I)(iii) is selected from the group consisting of dipropylene glycol, tripropylene glycol monomethyl ether, tetraethylene glycol, diethylene glycol monoethyl ether, dipropylene glycol monomethyl ether, and mixtures of the foregoing, and the dispersed resin solids in the second liquid coating are vinyl-based resin.

3. A method according to claim 2, wherein the chromium-providing substance in the first liquid coating provides more than 5 but not more than about 60 grams per liter of chromium, expressed as $CrO_3$; the first liquid coating has a weight ratio of chromium, expressed as $CrO_3$, to pulverulent metal of between about 1:4 and 1:9; and the dispersed resin solids in the second liquid coating comprise an emulsion polymerized product of at least two polymerizable ethylenically unsaturated monomers.

4. A method according to claim 3, wherein the ethylenically unsaturated monomers are selected from the group consisting of styrene-butadiene, acrylate, alkyl-substituted acrylates, vinyl halides, vinylidene halides, alkylenes, halide-substituted alkylenes, acrylonitriles, and combinations thereof.

5. A method according to claim 4, wherein the pulverulent metal in the first liquid coating is zinc flake; said zinc flake is present in an amount above about 150 grams per liter of the first liquid coating; the amount of dispersed resin solid is less than 10% by weight of the second liquid coating; and the second liquid coating contains an acid selected from the group consisting of hydrofluoric acid, sulfuric acid, nitric acid, phosphoric acid, acetic acid, halogen-substituted acetic acids, and citric acid.

6. A method according to claim 5, wherein the second liquid coating comprises an activator selected from the group consisting of peroxides, chromates, dichromates, nitrates, permanganates, persulfates, perborates and iron (III).

7. A method according to claim 6, wherein the acid in the second liquid coating is hydrofluoric acid and the activator is hydrogen peroxide or iron (III).

8. A method according to claim 7, wherein the thickness of the autodeposited coating is at least 0.3 mils.

9. A method according to claim 8, wherein the pulverulent metal has an average particle size of less than about 16 microns.

10. A method according to claim 1, wherein the chromium-providing substance in the first liquid coating provides more then 5 but not more than about 60 grams per liter of chromium, expressed as $CrO_3$; the first liquid coating has a weight ratio of chromium, expressed as $CrO_3$, to pulverulent metal of between about 1:4 and 1:9; and the dispersed resin solids in the second liquid coating comprise an emulsion polymerized product of at least two polymerizable ethylenically unsaturated monomers.

11. A method according to claim 10, wherein the ethylenically unsaturated monomers are selected from the group consisting of styrene-butadiene, acrylate, alkyl-substituted acrylates, vinyl halides, vinylidene halides, alkylenes, halide-substituted alkylenes, acrylonitriles, and combinations thereof.

12. A method according to claim 4, wherein the pulverulent metal in the first liquid coating is zinc flake; said zinc flake is present in an amount above about 100 grams per liter of the first liquid coating; the amount of dispersed resin solid is less than 10% by weight of the second liquid coating; and the second liquid coating contains an acid selected from the group consisting of hydrofluoric acid, sulfuric acid, nitric acid, phosphoric acid, acetic acid, halogen-substituted acetic acids, and citric acid.

13. A method according to claim 1, wherein the second liquid coating comprises an activator selected from the group consisting of peroxides, chromates, dichromates, nitrates, permanganates, persulfates, perborates and iron (III).

14. A method according to claim 13, wherein the acid in the second liquid coating is hydrofluoric acid and the activator is hydrogen peroxide or iron (III).

15. A method according to claim 1, wherein the thickness of the autodeposited coating is at least 0.3 mils.

16. A method according to claim 1, wherein the pulverulent metal has an average particle size of less than about 16 microns.

17. An article of manufacture comprising a metal substrate that has been provided with a dual layer coating by a method according to claim 16.

18. An article of manufacture comprising a metal substrate that has been provided with a dual layer coating by a method according to claim 15.

19. An article of manufacture comprising a metal substrate that has been provided with a dual layer coating by a method according to claim 9.

20. An article of manufacture comprising a metal substrate that has been provided with a dual layer coating by a method according to claim 1.

* * * * *